United States Patent [19]
Lopez et al.

[11] Patent Number: 5,094,991
[45] Date of Patent: Mar. 10, 1992

[54] SLURRY CATALYST FOR HYDROPROCESSING HEAVY AND REFRACTORY OILS

[75] Inventors: Jaime Lopez, Benicia, Calif.; Eugene A. Pasek, Monroeville, Pa.

[73] Assignee: Chevron Research Company, San Francisco, Calif.

[21] Appl. No.: 657,351

[22] Filed: Feb. 15, 1991

Related U.S. Application Data

[63] Continuation of Ser. No. 275,235, Nov. 22, 1988, abandoned, which is a continuation-in-part of Ser. No. 767,822, Aug. 21, 1985, abandoned, which is a continuation-in-part of Ser. No. 527,414, Aug. 29, 1983, Pat. No. 4,557,821.

[51] Int. Cl.$^5$ .................... B01J 27/047; B01J 27/051
[52] U.S. Cl. .................................. 502/219; 502/220
[58] Field of Search ............. 208/215, 216 PP, 216 R; 502/219, 220

[56] References Cited

U.S. PATENT DOCUMENTS

| | | | |
|---|---|---|---|
| 4,234,554 | 1/1981 | Naumann et al. | 502/220 |
| 4,430,442 | 2/1984 | Sawyer et al. | 502/200 |
| 4,430,443 | 2/1984 | Seiver et al. | 502/200 |
| 4,528,089 | 7/1985 | Pewraro et al. | 208/216 R |
| 4,548,710 | 10/1985 | Simpson | 208/216 PP |
| 4,557,821 | 12/1985 | Lopez et al. | 208/216 R |
| 4,581,125 | 4/1986 | Stiefec et al. | 208/216 R |
| 4,592,827 | 6/1986 | Galiasso et al. | 208/216 R |
| 4,595,672 | 6/1986 | Hu et al. | 208/216 R |
| 4,650,563 | 3/1987 | Jacobson et al. | 208/216 R |
| 4,705,619 | 11/1987 | McCandlish et al. | 208/216 R |

Primary Examiner—Oiik Chaudhuri
Assistant Examiner—G. Fourson

[57] ABSTRACT

Group VIB metal sulfide slurry catalysts having a pore volume in the pore size range 10 to 300Å radius of at least 0.1 cc/g. Also, Group VIB metal sulfide catalysts having a surface area of at least 20 m$^2$/g. Suitable Group VIB metals are molybdenum and tungsten, preferably molybdenum. The Group VIB metal sulfide can be approximately a Group VIB metal disulfide. The slurry catalyst can be promoted with a Group VIII metal, such as nickel or cobalt.

8 Claims, 5 Drawing Sheets

SLURRY CATALYST FOR HYDROPROCESSING HEAVY AND REFRACTORY OILS

CROSS-REFERENCE TO RELATED APPLICATIONS

This application is a continuation of application Ser. No. 275,235, filed Nov. 22, 1988 now abandoned, which is a continuation-in-part of Ser. No. 767,822, filed Aug. 21, 1985, by J. Lopez and E. A Pasek, now abandoned, which is a continuation-in-part of Ser. No. 527,414, filed Aug. 29, 1983, by J. Lopez, J. D. McKinney and E. A. Pasek now U.S. Pat. No. 4,557,821.

BACKGROUND OF THE INVENTION

This invention relates to Group VIB metal sulfide slurry catalysts used for the catalytic hydroprocessing of heavy hydrocarbonaceous oils including crude oils, heavy distillates, such as FCC decanted oils and lubricating oils. The catalysts can also be used for the hydroprocessing of shale oils, oils from tar sands and coal liquids.

The Group VIB metal sulfide slurry catalyst particles of this invention can exist as a substantially homogeneous dispersion in a water/oil mixture of very small particles made up of extremely small crystallites. Examples of suitable Group VIB metals include molybdenum and tungsten. Each of these metals can be present in approximately the disulfide form. However, the apparent atomic ratio of sulfur to metal can be greater or less than 2. The preferable metal is molybdenum and the molybdenum catalyst will be particularly described herein. The catalyst is probably structured molecularly as platelets formed from hexagonal sheets of molybdenum or tungsten atoms separated by two hexagonal layers of sulfur atoms with activity sites concentrated at the edge of each basal plane of the molybdenum or tungsten atoms.

We have found that the activity of the catalyst of this invention can be defined by the pore volume expressed as cubic centimeters per gram (cc/g) based on pores in the 10 to 300 Angstroms (Å) radius size range. The catalyst of this invention has at least 0.1 cc/g pore volume in pores between 10 and 300Å in radius; preferably at least 0.15 and most preferably at least 0.2 cc/g in pores having a radius between 10 and 300Å. Catalysts of this invention can have a pore volume in pores having a radius between 10 and 300Å of between 0.15 or 0.2 to 1 cc/g. Good activity is obtained in the range 0.2 to 0.4 cc/g while preferably activity is obtained by extending the upper end of the range to 1 cc/g, or higher.

We have found that the catalyst of this invention can also be defined by its surface area expressed as square meters per gram ($m^2/g$). Good activity is achieved with a surface area of at least 20 or 25 $m^2/g$. Surface areas between 25 and 75 or 100 $m^2/g$ give good catalyst activities while surface areas above 75 or 100 cc/g and up to 400 cc/g, or higher, give preferable activity.

The following equations are used to calculate the pore volume and surface area of the catalysts on a carbon-free basis.

EQUATIONS FOR PORE VOLUME AND SURFACE AREA

Pore Volume, $$cc/g = 100 \frac{\text{(Pore Volume of Used Catalyst, cc/g)} + \frac{1}{d}\text{(Percent Carbon)}}{(100 - \text{Percent Carbon})}$$

where d is the density of the carbonaceous material, assumed to be 1.0 for "coke" make from decant oil.

Surface Area, $$m^2/g = \frac{\text{(Surface Area of Used Catalyst, } m^2/g\text{)}100}{(100 - \text{Percent Carbon})}$$

The hydrogen associated with the coke is disregarded for both equations.

The slurry catalyst as described is prepared directly as dispersed particles of a highly active form of molybdenum sulfide, as contrasted to a granulated precipitate. In general, the catalyst is prepared by presulfiding a Group VI metal compound in an aqueous environment, and charging said sulfided compound into a hydroprocessing reactor zone at a temperature sufficient to convert said sulfided compound into an active hydroprocessing catalyst.

More specifically, the first step in the preparation of this catalyst comprises formation of oxygen containing generally soluble ammonium salts of molybdenum for sulfiding. Ammonium molybdate is a suitable soluble salt. The ammonium molybdate can be presulfided to form some ammonium molybdenum oxysulfide solids. The ammonium molybdate and any oxysulfides is then sulfided with a sulfiding agent in a plurality of zones of increasing temperature, including low, intermediate and high-temperature sulfiding zones. Hydrogen sulfide, preferably with hydrogen, is a suitable sulfiding agent. Each sulfiding step replaces a portion of the oxygen associated with the molybdenum with sulfur. The low and intermediate temperature sulfiding zones contain water and can be operated either in the presence of feed oil or in the substantial absence of feed oil. Feed oil and water are both present in the high temperature sulfiding zone. If feed oil is not present in the low or intermediate temperature sulfiding zones, ammonia can be separated from the system after the low or intermediate temperature sulfiding zones and before addition of feed oil.

The final catalyst comprises crystallites of molybdenum sulfide and can be $MoS_2$. However, frequently the atomic ratio of sulfur to molybdenum is not 2 or is only approximately 2. It is an exceptionally active form of molybdenum sulfide or $MoS_2$. It appears that the activity of the final catalyst depends upon the conditions employed during its preparation. Application Ser. No. 527,414, filed Aug. 29, 1983, now U.S. Pat. No. 4,557,821, which is hereby incorporated by reference, taught the presence of both feed oil and water during the majority of stages of multistage sulfiding of the precursor ammonium salt to molybdenum sulfide and did not teach ammonia removal during catalyst preparation. That method of catalyst preparation is referred to herein as the oil method and results in a molybdenum sulfide catalyst having a pore volume in pores in the 10 to 300Å radius range of between about 0.1 to about 0.4 cc/g and a surface area in the range of about 20 to about 75 $m^2/g$. An improvement in catalyst activity can be achieved by performing a portion of the multistage sulfiding of the precursor ammonium salt in an aqueous phase in the substantial absence of any hydrocarbon oil and by separating ammonia from the system in advance of the addition of an oil phase. For example, the low-temperature sulfiding stage or the low and intermediate temperature sulfiding stages can be operated in the absence of hydrocarbon oil. If oil is first added to the intermediate temperature sulfiding stage, then ammonia can be vented after the low-temperature sulfiding stage. If oil is first added to the high-temperature sulfiding stage, then ammonia can be vented after the intermediate temperature sulfiding stage. This method is referred to herein as the water method and results in a molybdenum sulfide catalyst having a pore volume in pores in the 10 to 300Å unit radius range of between about 0.1 and about 1 cc/g and a surface area of about 20 to about 350 m²/g, or higher.

The ammonium molybdate used can be prepared by dissolving a molybdenum compound, such as $MoO_3$, in aqueous ammonia to form ammonium molybdates, with or without the subsequent injection of hydrogen sulfide to the dissolving stage. The ammonium molybdates are generally soluble in the aqueous ammonia but the addition of hydrogen sulfide causes some dissolved molybdenum to separate as ammonium molybdenum oxysulfide solids.

Aqueous ammonium molybdenum oxysulfide from the dissolving stage can be mixed with all or a portion of the feed oil stream as described below using the dispersal power of a hydrogen-hydrogen sulfide stream and the admixture can be passed through a plurality of sulfiding zones of ascending temperature. The sulfiding zones can be three in number, to provide a time-temperature sequence which is necessary to complete the preparation of the slurry catalyst prior to passing it to a higher temperature exothermic hydroprocessing reactor zone. Each sulfiding zone is operated at a temperature higher than its predecessor. The residence time in each sulfiding zone is sufficient to inhibit excessive coking and can be, for example, 0.02 to 0.5 hours, or more. The various sulfiding zones can employ the same or different residence times. For example, the high-temperature sulfiding reactor can employ a residence time of 2 hours, or more. In general, the residence time in each sulfiding zone can be at least 0.02, 0.1 or 0.2 hours. The residence time in each zone can also be at least 0.3, 0.4 or 0.5 hours. Each sulfiding zone is constituted by a time-temperature relationship and any single reactor can constitute one or more than one sulfiding zones depending upon whether the stream is heated or is at a constant temperature in the reactor and upon the duration of the stream time within a particular temperature range during stream residency in the reactor.

The first sulfiding stage is operated at a relatively low temperature with an aqueous phase and with or without feed oil. The second sulfiding stage is operated at an intermediate temperature which is higher than the temperature of the low-temperature sulfiding stage with an aqueous phase and either with or without feed oil. The third sulfiding stage is a high-temperature stage and is operated at a temperature which is higher than the temperature in the intermediate temperature stage. It is performed with both an aqueous and oil phase.

The sulfiding reactions occurring in the low and intermediate temperature sulfiding stages generate ammonia from gradual decomposition of ammonium molybdates and/or ammonium molybdenum oxysulfides. If no oil is present, this ammonia, together with any excess ammonia present from the earlier reaction of ammonia with molybdenum oxide, can be flashed in a separator zone and separated from slurry-containing separator residue in advance of the high-temperature sulfiding stage and prior to addition of oil. Feed oil is added to the separator residue and the separator residue with feed oil is passed to the high-temperature sulfiding stage.

If the temperature in the high-temperature sulfiding reactor is sufficiently high for hydroprocessing metals-containing or refractory hydrocarbon feed oil, the residence time in the high-temperature reactor can be sufficient to accomplish both the high-temperature sulfiding and the required hydroprocessing reactions. If a higher temperature is required to accomplish hydroprocessing of the feed oil, the effluent stream from the high-temperature reactor is passed to a hydroprocessing reactor operated at a hydroprocessing temperature which is higher than the temperature in the high-temperature sulfiding reactor.

Although not to be bound by any theory, it is believed that the following reactions occur in the various catalyst preparation steps described above. In the first catalyst preparation step, insoluble, crystalline $MoO_3$ is mixed with water to form a non-oleaginous slurry which is reacted with ammonia to form soluble ammonium molybdates according to the following generalized equation:

$$7MoO_3 + 6NH_3 + 3H_2O \longrightarrow (NH_4)_6Mo_7O_{24}$$
Insoluble                        Soluble
Crystalline The $MoO_3$ is dissolved under the following conditions:

| | |
|---|---|
| $NH_3$/Mo Weight Ratio | 0.1 to 0.6; preferably 0.15 to 0.3 |
| Temperature, °F. | 33 to 350; preferably 120 to 180 |
| Pressure: psig | 0 to 400; preferably 0 to 10 |

The pressure and temperature are not critical. Increased pressure is required to maintain the ammonia in aqueous solution at elevated temperatures. Elevated temperature is necessary to insure reaction and vary the concentration of molybdenum dissolved in the solution.

The solution of ammonium molybdate, which may be presulfided to form some ammonium molybdenum oxysulfides, is passed to a series of sulfiding reactors or zones operated at ascending temperatures. It is first passed to a relatively low-temperature sulfiding reactor where it is contacted with gaseous hydrogen sulfide, preferably a hydrogen/hydrogen sulfide blend, with or without feed oil. The generalized sulfiding reaction is as follows:

$$(NH_4)_6Mo_7O_{24} + H_2S \longrightarrow (NH_4)_xMoO_yS_z$$
amorphous

The above is a generalized equation. The reaction products in the low-temperature sulfiding reactor include ammonium molybdates, ammonium molybdenum oxysulfides and possibly molybdenum sulfides.

Following are the conditions in the low temperature sulfiding reactor:

| | |
|---|---|
| SCF $H_2S$/lbs Mo ratio | above 2.7; preferably above 12 |

| | |
|---|---|
| Temperature, °F. | 70 to 350; preferably 130 to 180 |
| Hydrogen sulfide partial pressure, psi | 3 to 400; preferably 150 to 250 |

It is important not to exceed the above temperature range in the low-temperature reactor. At temperatures above 350° F. ammonia loss from the catalyst precursor to produce a lower ammonia entity will occur faster than thiosubstitution can proceed and the molybdenum compound will precipitate and possibly plug the reactor. It is possible to operate the low-temperature reactor at a temperature below 325° or 350° F. for a relatively long duration to allow the thiosubstitution reaction to proceed faster than ammonia loss so that the molybdenum compound rich in oxygen will not precipitate.

The effluent stream from the low-temperature reactor is passed to an intermediate temperature reactor, which may or may not contain oil, operated under the following conditions:

| | |
|---|---|
| Temperature, °F. | 180 to 700; preferably 300 to 550 |
| Hydrogen sulfide partial pressure, psi | 3 to 440; preferably 150 to 250 |

The temperature in the intermediate temperature reactor is higher than the temperature in the low-temperature reactor.

The following generalized reaction may occur in the intermediate temperature reactor:

$$(NH_4)_{x'}MoO_6S_2 + H_2S \rightarrow MoO_x, S_y, + NH_3$$

where
x' is about 1.
y' is about 2.

The molybdenum compound in the intermediate temperature reactor is sufficiently sulfided so that upon loss of ammonia it is in a particulate form which is sufficiently fine that it can remain dispersed with sufficient agitation. In addition, the molybdenum compound is sufficiently sulfided that a crystalline structure is evolving from the amorphous form it exhibited in the low-temperature sulfiding temperature reactor where its level of sulfiding was so low that a loss of ammonia would induce precipitation and reactor plugging.

The molybdenum compound leaving the intermediate temperature sulfiding stage requires further conversion of oxygen to sulfur to achieve the molybdenum sulfide active catalyst state. This further conversion occurs in the presence of feed oil in a high-temperature sulfiding reactor, which is operated a temperature above the temperature of the intermediate temperature sulfiding reactor. The reaction occurring in the high-temperature sulfiding reactor in the presence of an oil/water phase may be expressed by the following equation:

$$MoO_xS_y \xrightarrow{H_2/H_2S} MoS_2 + H_2O$$

Highly
Active where
x is about 1
y is about 2.

The high-temperature sulfiding reactor is operated at a temperature in the range 500° to 750° F. and can also be employed as the hydroprocessing reactor if the feed oil is capable of being hydroprocessed at the temperature of the high-temperature sulfiding reactor. However, feed oils commonly require hydroprocessing at temperatures above the temperature of the high-temperature sulfiding reactor. In such case, a downstream hydroprocessing reactor is required. In general, the temperature in the hydroprocessing reactor is 650° to 950° F. and is above the temperature of the high-temperature sulfiding reactor.

The total pressure in the sulfiding zones and the hydroprocessing reactor can be between about 500 and about 5,000 psi.

If the aqueous catalyst precursor leaving the intermediate temperature reactor were to be passed together with feed oil and hydrogen sulfide directly to a hydroprocessing reactor operated at a temperature above the temperature of the high-temperature sulfiding reactor, such as 800° F., or above, the molybdenum compound would react with the water present to lose sulfur rather than gain it to form an inactive catalyst according to the following reaction:

$$MoO_xS_y + H_2O \xrightarrow{800° F.} MoO_x, S_{y'} +$$

Inactive
Catalyst $H_2S$ or $(MoO_2/MoS_2 + H_2S)$

Mixtures where y' is less than 2. This material is not a sufficiently active catalyst to inhibit coking reactions. It is noted that the $MoO_xS_y$ (where x is about 1, y is about 2) in the presence of hydrogen sulfide and water reacts preferentially with the hydrogen sulfide to become sulfided at a temperature between 500° to 750° F. It has been found that the $MoS_2$ catalyst formed in the temperature range 500° to 750° F. is a low-coking catalyst. However, at a temperature above this range, the $MoO_xS_y$ (where x is about 1 and y is about 2) in the presence of hydrogen sulfide and water reacts to form $MoO_x,S_{y'}$ (where y' is less than 2), which is inactive It will be appreciated that the low, intermediate and high-temperature sulfiding zones, stages or steps described herein can constitute separate reactors, as illustrated, or some or all of these zones, stages or steps can be merged into a single reactor. In terms of concept, each of these sulfiding zones, stages or steps is represented by a residence time-temperature relationship. If the stream is heated through the temperature range indicated above for any sulfiding zone, stage or step for the time indicated above, then the performance of the process requirements to satisfy that zone, stage or step has occurred.

If desired, the hydrogenation, desulfurization and denitrogenation activities of Group VIB metal catalysts of this invention can be improved by promotion with at least one Group VIII metal, such as nickel or cobalt. The Group VIII metal can be added to the Group VIB slurry catalyst in any convenient form, e.g., as water-soluble inorganic salts or as organometallic compounds. The weight ratio of Group VIII metal to Group VIB metal can be 0.001 to 0.75, generally; 0.01 to 0.03, preferably; and 0.08 to 0.20, most preferably. Examples of suitable water-soluble inorganic salts of Group VIII metals are sulfates, nitrates, etc. Examples of suitable organometallic compounds of Group VIII metals include naphthenates, porphyrins, etc. The Group VIII metal compound can be added to the slurry of Group VIB metal flowing to or within the low, intermediate or high-temperature sulfiding steps described herein and is preferably added to the catalyst precursor after it departs from the ammonia dissolving stage.

The catalyst preparation method described above uses $MoO_3$ as a starting material for preparing the catalyst precursor. However, other molybdenum compounds are also useful. For example, thiosubstituted ammonium molybdates, such as ammonium oxythiomolybdate or ammonium thiomolybdate can be employed. Since these materials are produced from $MoO_3$ in the first two catalyst preparation steps described above, i.e., the reaction of $MoO_3$ with ammonia step and the low-temperature sulfiding step, these two steps can be by-passed by employing these thiosubstituted compounds as starting materials. Therefore, when these thiosubstituted compounds are used as catalyst precursors, a water slurry thereof can be injected with hydrogen sulfide and hydrogen and passed directly to the intermediate temperature sulfiding reactor described above, followed by separation of ammonia and then the high-temperature sulfiding reactor and the hydroprocessing reactor, as described above.

To complete the cycle for the process of slurry catalyst preparation and use as described above, it is necessary to recover and recycle the catalyst. Following the hydroprocessing operation, an oil product can be recovered in atmospheric and vacuum distillation towers. The vacuum tower bottoms contains the catalyst, possibly with contaminant metals acquired from the feed oil. Some or all of the vacuum tower bottoms is treated with a solvent to separate non-asphaltic oils from asphalt containing catalyst with metallic contaminants.

The deactivated catalyst can comprise molybdenum sulfide catalyst and can be contaminated with vanadium, nickel and some iron, derived from the oil being treated, all as sulfides. The catalyst-containing mixture can be passed to a combustion zone to burn off coke and asphalt and to convert the metal sulfides to the corresponding metal oxides of their highest stable oxidation state. The oxidized spent catalyst can then be passed to an aqueous ammonia dissolving zone to dissolve molybdenum in preference to the contaminating metals. Thereupon, to repeat the catalyst preparation procedure, the resulting aqueous ammonium molybdate solution is reacted with hydrogen sulfide in a plurality of sulfiding stages as described above to prepare a molybdenum sulfide catalyst for return to the oil hydrotreating process.

Before referring to the figures, the following examples will further illustrate the present invention. Examples 1 and 4 show the preparation of catalysts by the oil method. Examples 2, 5, 8, 9, 10, 11 and 12 show the preparation of catalysts by the water method. Examples 3, 6 and 7 show the preparation of catalysts by prior art methods.

EXAMPLES

Example 1

In this example the catalyst was prepared according to the oil method. The method of preparation was as follows:

Step 1—1884.1 Grams of molybdenum trioxide (Climax Molybdenum Grade L) was slurred in 7309.4 grams of distilled water. To this slurry, 1307.5 grams of ammonium hydroxide (23.2 weight percent ammonia) was added and mixed well. The resulting mixture was exposed to the following conditions:

| | |
|---|---|
| Temperature: °F. | 150.0 |
| Pressure: psia | 14.7 |
| Time: hrs | 2.0 |

Step 2—A portion of the resultant mixture from Step 1 was introduced to a reactor and heated to 150.0° F. and the pressure was increased to 35.0 psig. At this time a flow of 92% hydrogen - 8% hydrogen sulfide gas was introduced into the reactor. The reactor was maintained at these conditions for 0.5 hours and at a gas flow rate and for a time such that 2.7 SCF of $H_2S$ was contacted per pound of molybdenum. This level of presulfiding is not enough to decompose the molybdate formed in the first step and thus liberate a substantial amount of ammonia. At the end of this low-temperature sulfiding step, the reactor was cooled and depressurized; the resulting catalyst is removed from the reactor. This catalyst is identified as Catalyst A.

Step 3—Catalyst A was then charged with a decanted oil, inspections of which are found in Table I, to a rocker-bomb reactor. The rocker-bomb reaction was pressurized with a 92% hydrogen - 8% hydrogen sulfide gas mixture and heated to run temperature. This heat-up period lasted about 6 hours and constituted the intermediate temperature sulfiding step. The high-temperature sulfiding step occurred under hydroprocessing conditions, which were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |

| -continued | |
|---|---|
| Mo/Oil: wt/wt | 0.042 |

The results of this screening run are shown in Table II under the column labeled Catalyst A.

EXAMPLE 2

In this example, the catalyst was prepared according to the water method. The method of preparation was as follows:

Step 1—1884.1 Grams of molybdenum trioxide (Climax Molybdenum Grade L) was slurried in 7309.4 grams of distilled water. To this slurry, 1307.5 grams of ammonium hydroxide (23.2 weight percent ammonia) was added and mixed well. The resulting mixture was exposed to the following conditions:

| Temperature: °F. | 150.0 |
|---|---|
| Pressure: psia | 14.7 |
| Time: hrs | 2.0 |

Step 2—A portion of the resultant mixture from Step 1 was introduced to a reactor and heated to 150.0° F. and the pressure was increased to 2500.0 psig. At this time a flow of a 92% hydrogen - 8% hydrogen sulfide gas was introduced into the reactor. After a 0.5 hours time period the temperature was increased to 450° F. and maintained for 0.5 hours. At the end of this period the gas flow was stopped and the pressure was reduced to 750.0 psig while maintaining temperature, this hold cycle was held for 0.5 hours. At the end of this sulfiding step, the reactor was cooled and depressurized and gaseous ammonia was flashed off. The gas flow rate and time of reaction were such that at least 10.5 SCF of $H_2S$ was contacted per pound of molybdenum. This level of sulfiding is sufficient to decompose the molybdate formed in the first step, therefore liberating a substantial amount of ammonia. The resulting catalyst was removed from the reactor. This catalyst is identified in Catalyst B.

Step 3—Catalyst B was then charged with the decanted oil of Table I to a rocker-bomb reactor. The rocker-bomb reactor was pressurized with a 92% hydrogen - 8% hydrogen sulfide gas mixture and heated to run temperature. This heat-up period lasted about 6 hours and constituted the high-temperature sulfiding step. Hydroprocessing then occurred under the following conditions:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio | |
| Mo/Oil: wt/wt | 0.042 |

The results of this screening run are shown in Table II under the column labeled Catalyst B.

EXAMPLE 3

In this example, the catalyst is a prior art catalyst and was prepared by thermochemical decomposition of ammonium tetra-thiomolybdate. The preparation was as follows:

Step 1—Ammonium tetrathiomolybdate was prepared following the procedure described by G. Kruss [*Justus Liebigs Mann Chem.*, 229, 29 (1884)]. 75.0 Grams of ammonium tetrathiomolybdate was slurried in 225.0 grams of distilled water. To this slurry, 417.0 cc of ammonium hydroxide (23.2 weight percent ammonia) was added and mixed well. The resulting mixture was maintained in an ice bath while the mixture was treated with gaseous hydrogen sulfide until blood-red crystals precipitated out. These crystals were filtered and washed with cold water.

Step 2—The thermochemical decomposition was performed following the procedure described by Tauster, Pecoraro and Chianelli [*Journal of Catalysis*, 63, 515–519 (180)]. The ammonium tetra-thiomolybdate from Step 1 was decomposed by heating the material in a furnace tube from 25.0° C. to 400° C. in a 120 cc/min flow of a 92% hydrogen - 8% hydrogen sulfide gas mixture over a period of 1.5 hours, when maximum temperature was reached the material was allowed to cool. The gas flow was continued until the material had cooled to 25° C. The furnace was nitrogen swept and the material was removed. This catalyst as identified as Catalyst C.

Step 3—Catalyst C was then charged with the decanted oil of Table I to a rocker-bomb reactor. The rocker-bomb reactor was pressurized with a 92% hydrogen - 8% hydrogen sulfide gas mixture and heated to run temperature. Operating conditions were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst C.

EXAMPLE 4

In this example, the catalyst was prepared according to the oil method utilizing acidic decomposition of ammonium tetra-thiomolybdate to form molybdenum trisulfide. The preparation was as follows:

| Pressures, | |
|---|---|
| Hydrogen: psig | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst D.

Example 5

In this example, the catalyst was prepared according to the water method utilizing acidic decomposition of ammonium tetra-thiomolybdate to form molybdenum trisulfide. The preparation was as follows:

Step 1—Ammonium tetrathiomolybdate was prepared following the procedure described by G. Kruss

[*Justus Liebigs Nann Chem.*, 229, 29 (1884)]. 75.0 Grams of ammonium tetrathiomolybdate was slurried in 225.0 grams of distilled water. To this slurry, 417.0 cc of ammonium hydroxide (23.2 weight percent ammonia) was added and mixed well. The resulting mixture was maintained in an ice bath while the mixture was treated with gaseous hydrogen sulfide until blood-red crystals precipitated out. These crystals were filtered and washed with cold water. 100 Grams of the resultant crystals were redispersed in 165.9 grams of distilled water. To this slurry and while stirring, 51.1 grams of formic acid, 90 percent by weight, were added. The resultant mixture was heated at 50° C. for 0.5 hours under a nitrogen atmosphere. The precipitate ($MoS_3$) was filtered and washed with water.

This formic acid decomposition method is described in Tauster, Pecoraro, and Chianelli [*Journal of Catalysis*, 63, 515-519 (1980)]. The precipitate was then redispersed in distilled water.

Step 2—The resultant slurry was introduced to a reactor, pressured to 2300 psig with 92% $H_2$—8% $H_2S$ gas and heated to 300° F. The reactor was maintained at these conditions for 0.5 hours. At the end of this intermediate temperature sulfiding step, the reactor is cooled and depressurized. The resulting catalyst was filtered and redispersed in distilled water. This catalyst is identified as Catalyst E.

Step 3—Catalyst E was then charged with a decanted oil, inspections of which are found in Table I, to a rocker-bomb reactor. The rocker-bomb reactor was pressurized with a 92% hydrogen - 8% hydrogen sulfide gas mixture and heated to run temperature. This heat-up period lasted about 6 hours and constituted a high-temperature sulfiding step. The high-temperature sulfiding step continued under hydroprocessing conditions, which were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst E.

EXAMPLE 6

In this example, the catalyst was prepared by the prior art method of thermochemical decomposition of molybdenum trisulfide. The preparation was as follows:

Step 1—Ammonium tetrathiomolybdate was prepared following the procedure described by G. Kruss [*Justus Liebigs Nann Chem.*, 229, 29 (1884)]. 75.0 Grams of ammonium tetrathiomolybdate was slurried in 225.0 grams of distilled water. To this slurry 417.0 cc of ammonium hydroxide (23.2 weight percent ammonia) was added and mixed well. The resulting mixture was maintained in an ice bath while the mixture was treated with gaseous hydrogen sulfide until blood-red crystals precipitated out. These crystals were filtered and washed with cold water. 100 Grams of the resultant crystals were redispersed in 165.9 grams of distilled water. To this slurry and while stirring, 51.1 grams of formic acid, 90 percent by weight, were added. The resultant mixture was heated at 50° C. for 0.5 hours under a nitrogen atmosphere. The precipitate ($MoS_3$) was filtered and washed with water. This formic acid decomposition method is described in Tauster, Pecoraro, and Chianelli [*Journal of Catalysis, 63, 515-519* (1980)].

Step 2—The thermochemical decomposition was performed following the procedure described by Tauster, Pecoraro and Chianelli [*Journal of Catalysis*, 63, 515-519 (1980)]. The molybdenum trisulfide from Step 1 was decomposed by heating the material in a furnace tube from 25° C. to 400° C. in a 120-cc/min flow of a 92% hydrogen - 8% hydrogen sulfide gas mixture over a period of 1.5 hours, when maximum temperature was reached the material was allowed to cool. The gas flow was continued until the material had cooled to 25° C. The furnace was nitrogen-swept and the material was removed. This catalyst is identified as Catalyst F.

Step 3—Catalyst F was then charged with the decanted oil of Table I to a rocker-bomb reactor. The rocker-bomb reactor was pressurized with a 92% hydrogen - 8% hydrogen sulfide gas mixture and heated to run temperature. Operating conditions were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst F.

EXAMPLE 7

The catalyst of this example is suspension grade molybdenum disulfide (Climax Molybdenum Disulfide-Suspension Grade) of the prior art. There was no preparation necessary for the catalyst. The material was used as received. This catalyst is identified as Catalyst G.

Catalyst G was then charged with the decanted oil of Table I to a rocker-bomb reactor. The rocker-bomb reactor was pressurized with a 92% hydrogen - 8% hydrogen sulfide gas mixture and heated to run temperature. Operating conditions were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst G.

Example 8

In this example, the catalyst was prepared according to the water method. The preparation was as follows:

Step 1—4.15 Pounds of molybdenum trioxide (Climax Molybdenum Grade L) was slurried in 16.1 pounds of distilled water. To this slurry, 2.88 pounds of ammonium hydroxide (25.1 weight percent ammonia) was added and mixed well. The resulting mixture was exposed to the following conditions:

| Temperature: °F. | 150.0 |
|---|---|
| Pressure: psia | 14.7 |
| Time: hrs | 2.0 |

Step 2—The resultant mixture from Step 1 was introduced to a reactor and heated to 200° F. and the pressure was increased to 400.0 psig. At this time a 14.0 SCFH flow of a 92% hydrogen - 8% hydrogen sulfide gas was introduced into the reactor. At the end of this low-temperature sulfiding step, the reactor was depressurized and gaseous ammonium was flashed off. The resulting catalyst is removed from the reactor. This catalyst is identified as Catalyst H.

Example 9

In this example, the catalyst was prepared according to the water method. The preparation was as follows:

Step 1—4.15 Pounds of molybdenum trioxide (Climax Molybdenum Grade L) was slurried in 16.1 pounds of distilled water. To this slurry, 2.88 pounds of ammonium hydroxide (25.1 weight percent ammonia) was added and mixed well. The resulting mixture was exposed to the following conditions.

| Temperature: °F. | 150.0 |
|---|---|
| Pressure: psia | 14.7 |
| Time: hrs | 2.0 |

Step 2—The resultant mixture from Step 1 was introduced to a reactor and heated to 150° F. and the pressure was increased to 400 psig. At this time a 14.0 SCFH flow of a 92% hydrogen—8% hydrogen sulfide gas was introduced to the reactor. The reactor was maintained at these conditions for 6.0 hours. At the end of this low-temperature sulfiding step, the reactor is depressurized and gaseous ammonia was flashed off. The resulting catalyst is removed from the reactor. This catalyst is identified as Catalyst I.

Step 3—Catalyst I was then charged with the decanted oil of Table I to a rocker-bomb reactor. The rocker-bomb reactor was pressurized with a 92% hydrogen - 8% hydrogen sulfide gas mixture and heated to run temperature. This heat-up period lasted about 6 hours and constituted both the intermediate and high-temperature sulfiding steps because both the intermediate and high-temperature sulfiding temperature ranges were traversed for the designated durations. The high-temperature sulfiding step continued under hydroprocessing conditions, which are as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst I.

Example 10

In this example, the catalyst was prepared according to the water method and is a duplicate of Example 9. the preparation was as follows:

Step 1—4.15 Pounds of molybdenum trioxide (Climax Molybdenum Grade L) was slurried in 16.1 pounds of distilled water. To this slurry, 2.88 pounds of ammonium hydroxide (25.1 weight percent ammonia) was added and mixed well.

The resulting mixture was exposed to the following conditions:

| Temperature: °F. | 150.0 |
|---|---|
| Pressure: psia | 14.7 |
| Time: hrs | 2.0 |

Step 2—A portion of the resultant mixture from Step 1 was introduced to a reactor and heated to 150° F. and the pressure was increased to 400.0 psig. At this time a 14.0 SCFH flow of a 92% hydrogen—8% hydrogen sulfide gas was introduced into the reactor. The reactor was maintained at these conditions for 6.0 hours. At the end of this low-temperature sulfiding step, the reactor is depressurized and gaseous ammonia was flashed off. The resulting catalyst is removed from the reactor. This catalyst is identified as Catalyst J.

Step 3—Catalyst J was then charged with the decanted oil of Table I to a rocker-bomb reactor. The rocker-bomb reactor was pressurized with a 92% hydrogen - 8% hydrogen sulfide gas mixture and heated to run temperature. This heat-up period lasted about 6 hours and constituted both the intermediate and high-temperature sulfiding steps because both the intermediate and high-temperature sulfiding temperature ranges were traversed for the designated durations. The high-temperature sulfiding step continued under hydroprocessing conditions, which are as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst J.

Example 11

In this example, the catalyst was prepared according to the water method. The preparation was as follows:
Step 1—0.63 Pounds of molybdenum trioxide (Climax Molybdenum Grade L) was slurried in 2.73 pounds of distilled water. To this slurry, 0.23 pounds of ammonium hydroxide (25.1 weight percent ammonia) was added and mixed well The resulting mixture was exposed to the following conditions:

| Temperature: °F. | 150.0 |
|---|---|
| Pressure: psia | 14.7 |
| Time: hrs | 2.0 |

Step 2—A portion of the resultant mixture from Step 1 was introduced to a reactor and heated to 150° F. and the pressure was increased to 400 psig. At this time a 14.0 SCFH flow of a 92% hydrogen - 8% hydrogen sulfide gas was introduced into the reactor. The reactor was maintained at these conditions for 8.0 hours. At the end of this low-temperature sulfiding step, the reactor is depressurized and ammonia was flashed off. The resulting catalyst is removed from the reactor. This catalyst is identified as Catalyst K.

Step 3—Catalyst K was then charged with the decanted oil of Table I to a rocker-bomb reactor. The rocker-bomb reactor was pressurized with a 92% hydrogen - 8% hydrogen sulfide gas mixture and heated to run temperature. The heat-up period lasted about 6 hours and constituted the intermediate and high-temperature sulfiding steps because both the intermediate and high-temperature sulfiding temperature ranges wee traversed for the designated durations. The high-temperature step was continued under hydroprocessing conditions which were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst K.

Example 12

In this example, the catalyst was prepared according to the water method. The preparation was as follows:

Step 1—0.63 Pounds of molybdenum trioxide (Climax Molybdenum Grade L) was slurried in 2.73 pounds of distilled water. To this slurry, 0.16 pounds of ammonium hydroxide (25.1 weight percent ammonia) was added and mixed well. The resulting mixture was exposed to the following conditions:

| Temperature: °F. | 150.0 |
|---|---|
| Pressure: psia | 14.7 |
| Time: hrs | 2.0 |

Step 2—A portion of the resultant mixture from Step 1 was introduced to a reactor and heated to 150° F. and the pressure was increased to 400.0 psig. At this time a 14.0 SCFH flow of a 92% hydrogen - 8% hydrogen sulfide gas was introduced into the reactor. The reactor was maintained at these conditions for 8 hours. At the end of this low-temperature sulfiding step, the reactor is depressurized and ammonia was flashed off. The resulting catalyst is removed from the reactor. This catalyst is identified as Catalyst L.

Step 3—Catalyst L was then charged with the decanted oil of Table I to a rocker-bomb reactor. The rocker-bomb reactor was pressurized with a 92% hydrogen - 8% hydrogen sulfide gas mixture and heated to run temperature. This heat-up period lasted about 6 hours and constituted the intermediate and high-temperature sulfiding steps because both the intermediate and high-temperature sulfiding temperature ranges were traversed for the designated durations. The high-temperature sulfiding step was continued under hydroprocessing conditions, which were as follows:

| Pressures, | |
|---|---|
| Hydrogen: psi | 2200.0 |
| Hydrogen Sulfide: psi | 182.0 |
| Water Vapor: psi | 390.0 |
| Temperature: °F. | 720.0 |
| Time at Temperature: hrs | 6.0 |
| Catalyst to Oil Ratio, | |
| Mo/Oil: wt/wt | 0.042 |

The results of this screening run are shown in Table II under the column labeled Catalyst L.

TABLE I

| FCC Decanted Oil Feedstock | |
|---|---|
| API Gravity | 5.0 |
| Hydrogen: wt % | 8.37 |
| Sulfur: wt % | 1.11 |
| Nitrogen: wppm | 846.0 |
| Distillation: °F. | |
| 10% | 662 |
| 30% | 701 |
| 50% | 732 |
| 70% | 781 |
| 90% | 887 |

TABLE II

| | Slurry Catalytic Processing | | | | | | | | | | | |
|---|---|---|---|---|---|---|---|---|---|---|---|---|
| Example Number: | 1 | 2 | 3 | 4 | 5 | 6 | 7 | 8 | 9 | 10 | 11 | 12 |
| Catalyst Designation: | A | B | C | D | E | F | G | H | I | J | K | L |
| Preparation Method: | Oil | Water | Prior Art | Oil | Water | Prior Art | Prior Art | Water | Water | Water | Water | Water |
| Product Quality: | | | | | | | | | | | | |
| API Gravity | 13.0 | 17.4 | 10.4 | 10.9 | 11.5 | 8.8 | 9.4 | 16.1 | 17.0 | 16.4 | 19.0 | 19.5 |
| Sulfur, wt. % | 0.52 | 0.16 | 0.68 | 0.70 | 0.65 | 0.84 | 0.81 | 0.26 | 0.12 | 0.16 | 0.09 | 0.07 |
| Nitrogen, ppm | 116 | 18 | 290 | 255 | 230 | 533 | 571 | 18 | 15 | 18 | 7 | 6 |
| Hydrogen, wt. % | 9.79 | 11.19 | 9.53 | 9.52 | 9.71 | 9.04 | 9.29 | 10.60 | 10.92 | 10.48 | 10.93 | 11.29 |
| Catalyst: | | | | | | | | | | | | |
| Sulfur/Molybdenum Ratio | 2.0 | 1.5 | 1.8 | 2.1 | 1.8 | 2.1 | 1.8 | 1.8 | 1.0 | 2.2 | 1.9 | 2.7 |
| Carbon, wt. % | 15.8 | 8.2 | 5.6 | 16.0 | 12.1 | 3.1 | 2.4 | 13.2 | 12.0 | 11.2 | 15.1 | 17.1 |
| Spent Catalyst: | | | | | | | | | | | | |
| BET Surface Area, m²/g | 43.5 | 144.4 | 7.3 | 23.4 | 139.4 | 7.3 | 10.7 | 76.3 | 74.6 | 75.8 | 282.1 | 291.6 |
| Avg. Pore Radius, Å | 54 | 37 | 49 | 31 | 30 | 52 | 62 | 29 | 23 | 25 | 27 | 36 |
| Pore Volume, cc/g.: | | | | | | | | | | | | |
| 10-300Å | 0.117 | 0.264 | 0.018 | 0.036 | 0.208 | 1.019 | 0.033 | 0.109 | 0.087 | 0.094 | 0.381 | 0.519 |
| Crystallite Thickness, Å | | | | | | | | | | | | |
| Angle 2θ = 19° (XRD) | | 22 | 24 | 24 | 14 | 1432 | 557 | 13 | 16 | | 19 | |
| Particle Diameter, micron | 10.6 | 4.5 | 4.4 | 4.8 | 4.5 | 7.6 | 2.5 | 4.8 | 5.1 | 11.8 | 5.0 | 9.1 |

TABLE II-continued

| | Slurry Catalytic Processing | | | | | | | | | | | |
|---|---|---|---|---|---|---|---|---|---|---|---|---|
| Example Number: | 1 | 2 | 3 | 4 | 5 | 6 | 7 | 8 | 9 | 10 | 11 | 12 |
| Catalyst Designation: | A | B | C | D | E | F | G | H | I | J | K | L |
| Preparation Method: | Oil | Water | Prior Art | Oil | Water | Prior Art | Prior Art | Water | Water | Water | Water | Water |
| Carbon-Free Basis: | | | | | | | | | | | | |
| BET Surface Area, m²/g | 52 | 157 | 8 | 28 | 159 | 8 | 11 | 88 | 85 | 85 | 332 | 352 |
| Avg. Pore Radius, Å | 126 | 48 | 203 | 168 | 47 | 137 | 107 | 63 | 55 | 54 | 38 | 47 |
| Pore Volume, cc/g.: | | | | | | | | | | | | |
| 10–300Å Radius | 0.327 | 0.377 | 0.078 | 0.233 | 0.374 | 0.052 | 0.058 | 0.278 | 0.235 | 0.232 | 0.627 | 0.823 |
| Pore Size Distribution: | | | | | | | | | | | | |
| Å Radius: | | | | | | | | | | | | |
| 250–300 | 15.6 | 12.7 | 15.4 | 7.3 | 4.0 | 19.6 | 12.0 | 7.2 | 4.0 | 4.3 | 6.3 | 5.5 |
| 200–250 | 9.6 | 13.0 | 17.5 | 7.9 | 4.6 | 18.5 | 12.7 | 10.0 | 5.2 | 5.0 | 4.5 | 5.3 |
| 150–200 | 13.9 | 19.5 | 25.6 | 12.7 | 6.3 | 23.5 | 19.4 | 9.8 | 6.0 | 7.0 | 8.3 | 8.9 |
| 100–150 | 16.2 | 26.7 | 15.6 | 12.5 | 9.7 | 18.7 | 16.1 | 10.5 | 7.7 | 10.4 | 8.2 | 14.8 |
| 90–100 | 3.2 | 5.1 | 4.1 | 3.7 | 2.3 | 3.8 | 3.9 | 2.7 | 2.7 | 2.4 | 2.0 | 3.3 |
| 80–90 | 4.6 | 5.6 | 3.8 | 3.3 | 2.7 | 2.5 | 4.6 | 2.3 | 2.7 | 3.0 | 2.2 | 3.5 |
| 70–80 | 5.3 | 5.3 | 3.5 | 3.0 | 2.7 | 1.9 | 4.6 | 2.3 | 2.6 | 3.6 | 2.2 | 2.8 |
| 60–70 | 6.2 | 4.5 | 4.4 | 4.5 | 2.7 | 3.4 | 3.8 | 2.8 | 4.3 | 3.5 | 2.7 | 3.1 |
| 50–60 | 6.1 | 4.5 | 3.0 | 4.9 | 4.3 | 4.3 | 3.9 | 3.6 | 4.9 | 4.6 | 3.3 | 4.0 |
| 40–50 | 5.1 | 2.3 | 2.8 | 5.7 | 6.1 | 2.8 | 3.9 | 4.4 | 6.0 | 6.0 | 4.5 | 4.9 |
| 30–40 | 4.1 | 0.7 | 3.2 | 6.2 | 7.7 | 1.0 | 4.4 | 5.9 | 7.6 | 8.3 | 6.8 | 6.5 |
| 20–30 | 4.9 | 0.0 | 1.0 | 7.1 | 13.8 | 0.0 | 4.3 | 10.9 | 14.0 | 12.1 | 11.6 | 10.3 |
| 10–20 | 5.2 | 0.0 | 0.0 | 21.2 | 33.0 | 0.0 | 6.5 | 27.5 | 32.3 | 29.8 | 37.2 | 26.9 |
| Total | 100.0 | 99.9 | 99.9 | 100.0 | 99.9 | 100.0 | 100.1 | 99.9 | 100.0 | 100.0 | 99.8 | 99.8 |

Table I shows specifications including API gravity, sulfur content and nitrogen content of the FCC decanted oil feed-stock hydroprocessed in the tests of the above examples.

Table II shows specifications including API gravity, sulfur content and nitrogen content of the oil after hydroprocessing. These results are presented graphically in FIGS. 1 through 6 for all the examples, except Example 5. The results of Example 5 are unaccountably erratic and therefore are not included in the figures.

Figure 1:
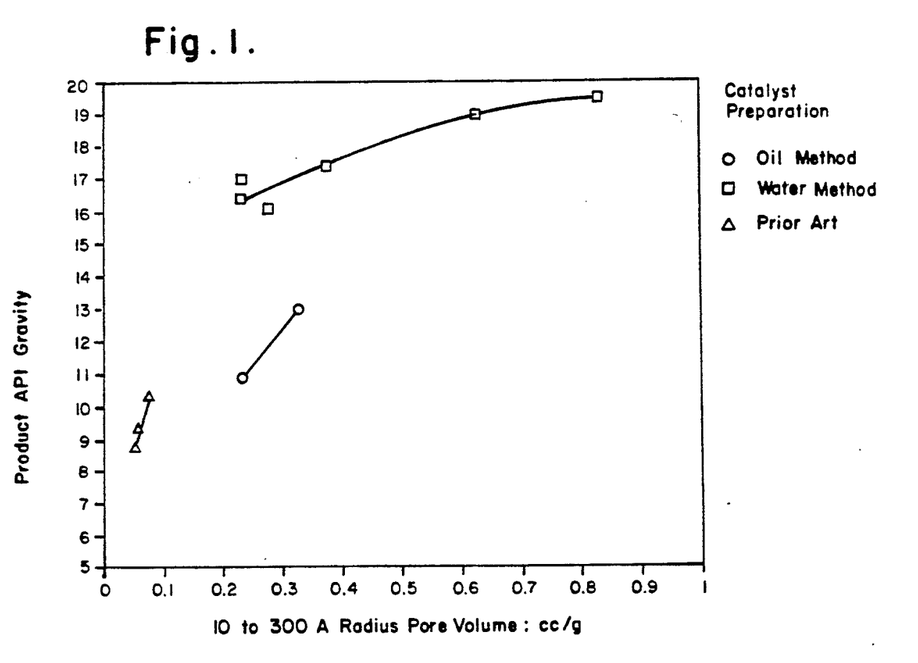
FIG. 1 relates to the AI gravity of a hydroprocessed oil to the 10 to 300Å radius pore volume in the molybdenum sulfide slurry catalyst.
Figure 2:
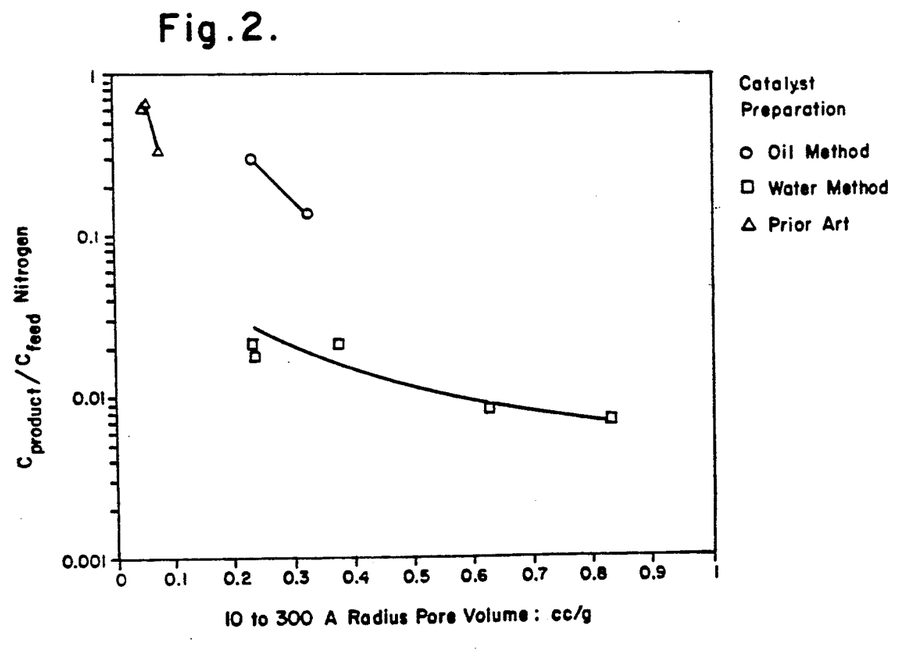
FIG. 2 relates to the ratio of nitrogen contents in the product and feed oils to the 10 to 300Å radius pore volume in the molybdenum sulfide slurry catalyst.
Figure 3:
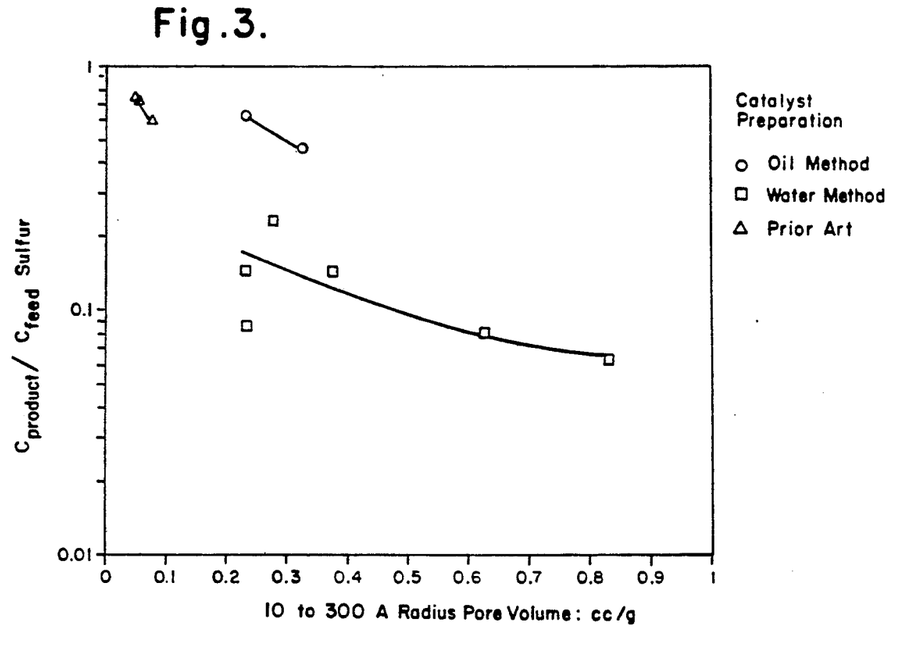
FIG. 3 relates to the ratio of sulfur contents in the product and feed oils to the 10 to 300Å radius pore volume in the molybdenum sulfide catalyst.

FIGS. 1, 2 and 3 show that the catalysts prepared by prior art methods have the smallest 10 to 300Å radius pore volume while catalysts prepared by the oil and water sequential sulfiding methods of this invention have higher 10 to 300Å radius poor volumes. The indicated ore volumes for the oil and water methods overlap, but certain of the catalysts prepared by the water method have the highest indicated pore volumes.

FIGS. 1, 2 and 3 show that the indicated ore volumes are generally correlatable to product API gravity, to the ratio of product to feed nitrogen levels and to the ratio of product to feed sulfur levels, respectively. In each figure, the poorest results are obtained with the prior art catalyst, which has the lowest 10 to 300Å radius pore volume. FIG. 1 shows that the prior art catalyst provides the lowest product API gravity. FIG. 2 shows that the prior art catalyst provides the highest product nitrogen levels. FIG. 3 shows that the prior art catalyst provides the highest product sulfur levels. FIGS. 1, 2 and 3, respectively, show that improved product API gravity, nitrogen and sulfur levels are obtained with the catalyst prepared by the oil method, which has an intermediate 10 to 300Å radius pore volume. FIGS. 1, 2 and 3 show that the oil method catalyst provides an intermediate product API gravity and intermediate product nitrogen and sulfur levels. FIGS. 1, 2 and 3 show that the best results are obtained with those catalysts prepared by the water method which have the highest 10 to 300Å radius pore volumes. FIGS. 1, 2 and 3, respectively, show that the water method catalyst provides the highest product API gravity and the lowest product nitrogen and sulfur levels.

Figure 4:
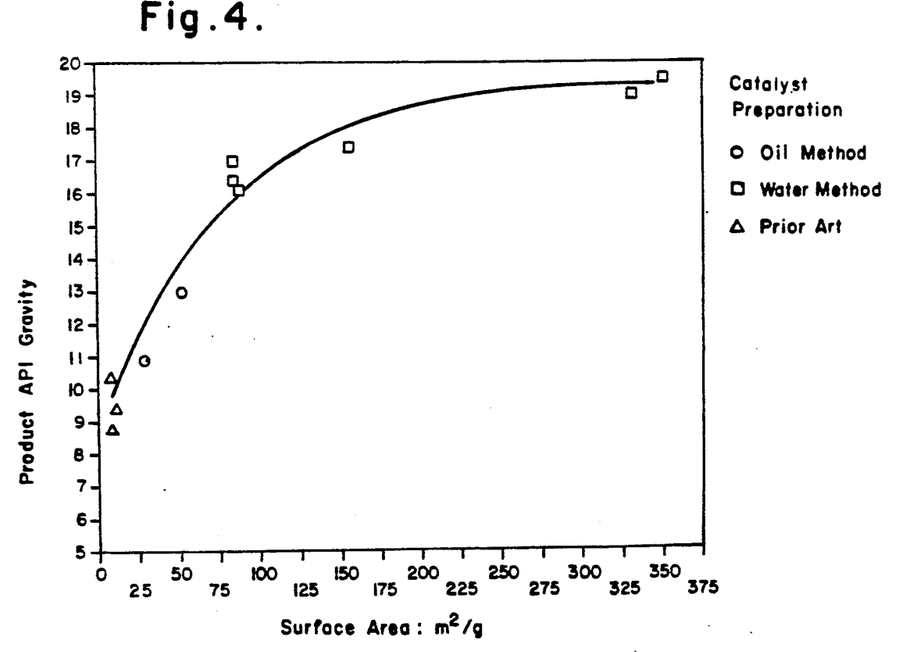
FIG. 4 relates to the API gravity in a hydroprocessed oil to the surface area of the molybdenum sulfide slurry catalyst.
Figure 5:
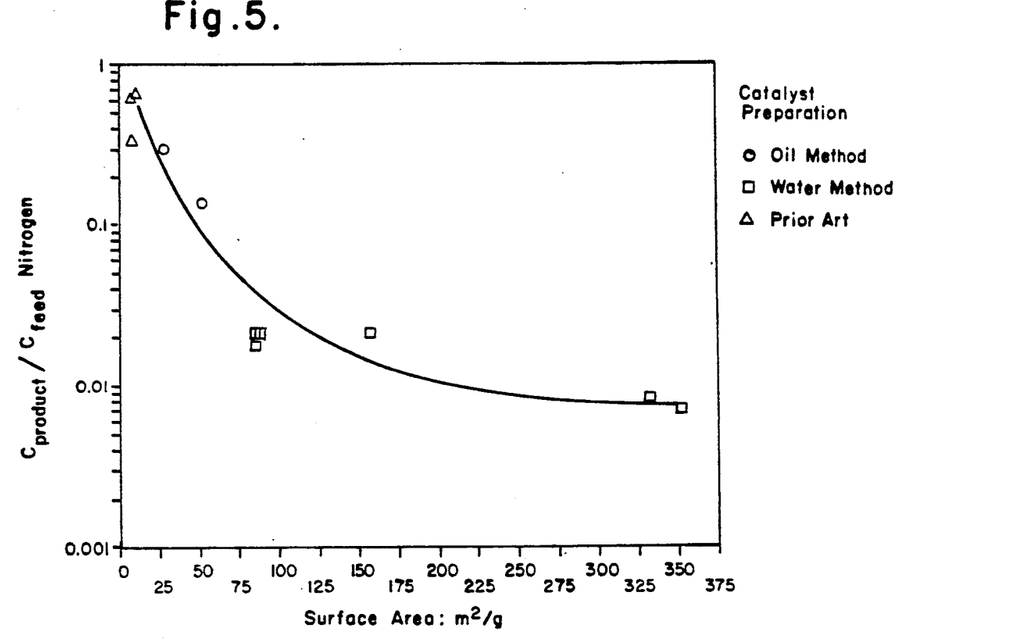
FIG. 5 relates to the ratio of nitrogen contents in the product and feed oils to the surface area of the molybdenum sulfide slurry catalyst.
Figure 6:
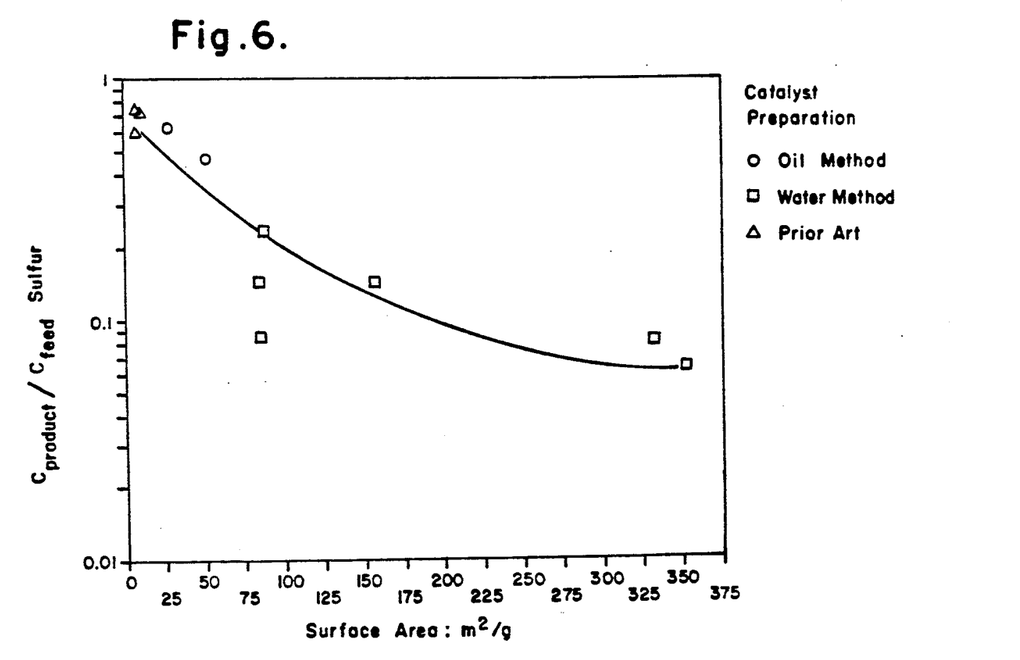
FIG. 6 relates to the ratio of sulfur contents in the product and feed oils to the surface area of the molybdenum sulfide slurry catalyst.

FIGS. 4, 5 and 6 show that the catalysts prepared by prior art methods have the lowest surface area while catalysts prepared by the oil method have a higher surface area and the catalysts prepared by the water sequential sulfiding method have by far the highest surface areas.

FIGS. 4, 5 and 6, respectively, show that the indicated surface areas are generally correlatable to product API gravity, ratio of product to feed nitrogen levels and ratio of product to feed sulfur levels. FIG. 4 shows that the prior art catalyst, which has by far the lowest surface area, provides by far the lowest product API gravity. FIG. 4 shows that the catalyst prepared by the oil method, which has an intermediate surface area, provides an intermediate product API gravity. Finally, FIG. 4 shows that the catalyst prepared by the water method, which has the highest surface area, provides the highest API gravity.

FIG. 5 shows that the catalyst prepared by the prior art method, which has the lowest surface area, provides the highest product nitrogen level. FIG. 5 shows that the catalyst prepared by the oil method, which has an intermediate surface area, provides a lower product nitrogen level. Finally, FIG. 5 shows that the catalyst prepared by the water method, which has by far the largest surface area, provides by far the lowest product nitrogen level. FIG. 6 shows that the prior art catalyst, which has the lowest surface are, a provides the highest product sulfur level. FIG. 6 shows that the catalyst prepared by the oil method, which has an intermediate surface area, provides a lower product sulfur level. Finally, FIG. 6 shows that the catalyst prepared by the water method, which has by far the largest surface area, provides by far the lowest product sulfur level.

FIGS. 1, 2 and 3 indicate that to provide high catalyst activity, the 10 to 300Å radius pore volume (cc/g) of the catalyst should be at least 0.1, preferably at least 0.15 and most preferably at least 0.2. The indicated pore volume range can be between 0.2 and 0.4, but is generally between 0.15 and 1, preferably between 0.2 and 1 and most preferably between 0.3, 0.4 or 0.5 and 1, or higher than 1.

FIGS. 4, 5 and 6 indicate that to provide high catalyst activity the surface area (m²/g) of the catalyst should be generally at least 20, preferably at least 25 and most preferably at least 50 or 100. The surface area range can be between 25 and 75, but is generally between 20 and 400, preferably between 25 and 400 and most preferably between 75 and 400, or higher than 400.

Figure 7:
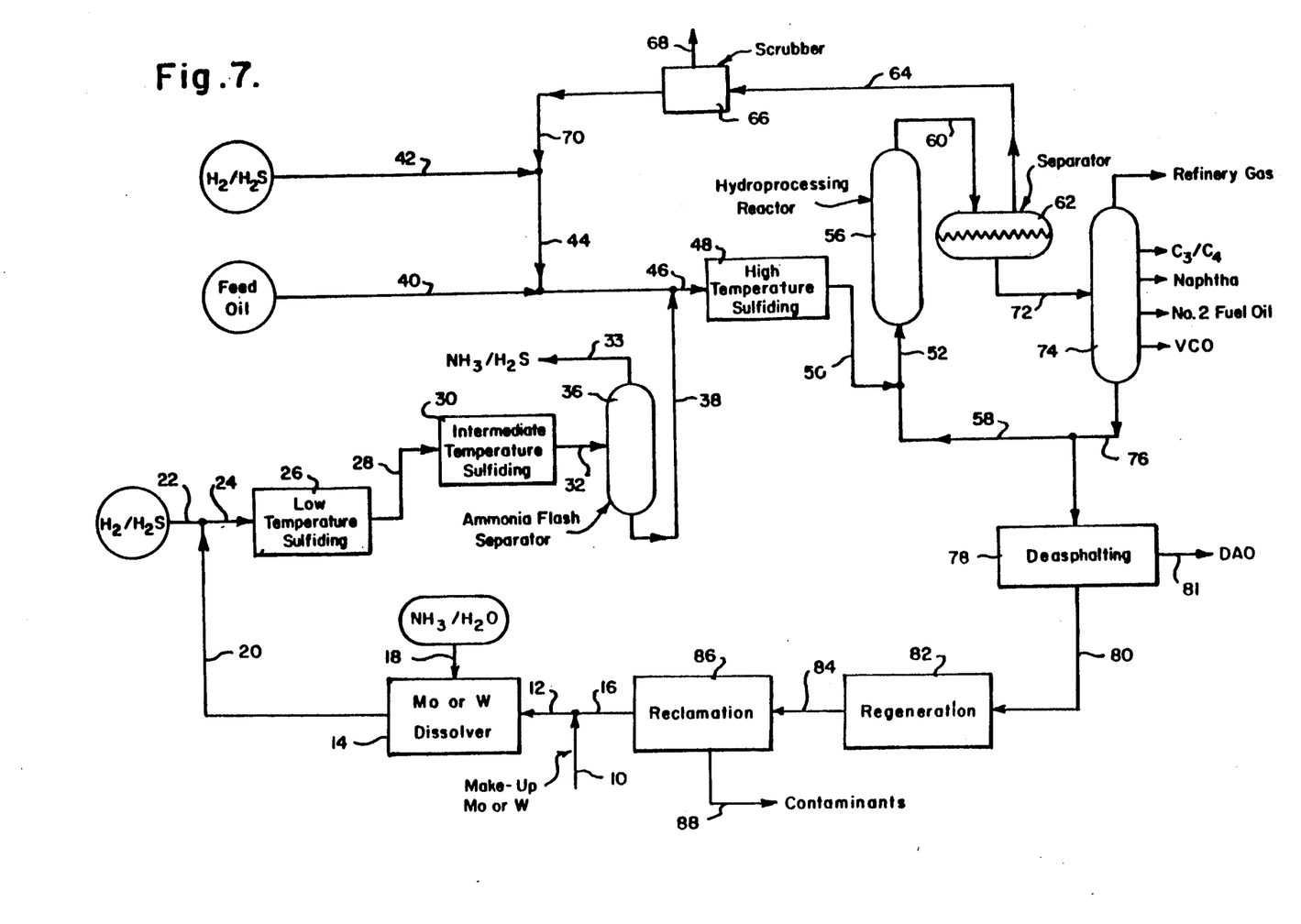
FIG. 7 illustrates a flow scheme for the preparation of a slurry catalyst by the water method and the use of said catalyst in a hydroprocess.

The water method for preparing a catalyst of this invention is illustrated in the FIG. 7. According to FIG. 7, molybdenum or tungsten, in the form of water-insoluble MoO3 or WO$_3$, is introduced through lines 10 and 12 to dissolver zone 14. Recycle molybdenum or tungsten, from a source described below, is introduced through line 16. Water and ammonia are added to dissolver zone 14 through line 18. Water-insoluble molybdenum oxide or tungsten oxide is converted to a water-soluble ammonium molybdate salt or ammonium tungstate salt in dissolver zone 14.

Aqueous ammonium molybdate or ammonium tungstate containing excess ammonia is discharged from zone 14 through line 20, admixed with hydrogen sulfide, preferably mixed with hydrogen, entering through line 22 and then passed through line 24 to low-temperature sulfiding zone 26. In low-temperature sulfiding zone 26, ammonium molybdate or ammonium tungstate is converted to thiosubstituted ammonium molybdates or thiosubstituted ammonium tungstates. In zone 26 the sulfiding temperature is sufficiently low that the ammonium salt is not decomposed while thiosubstitution is beginning. If the ammonium salt were decomposed in the early stages of thiosubstitution, an insoluble molybdate or oxythiomolybdate in a mixture with MoO3, or an insoluble tungstate or oxythiotungstate in a mixture with WoO3 would precipitate out, inhibiting further thiosubstitution.

An effluent stream from low-temperature sulfiding zone 26 is passed through line 28 to intermediate temperature sulfiding zone 30. Intermediate temperature sulfiding zone 30 is operated at a temperature higher than the temperature in low-temperature sulfiding zone 26. The sulfiding reaction is continued in zone 30 and ammonium oxythiomolybdate or ammonium oxythiotungstate is converted to molybdenum oxysulfide or tungsten oxysulfide and/or molybdenum trisulfide or tungsten trisulfide, thereby freeing ammonia.

An effluent stream from intermediate temperature sulfiding zone 30 is passed through line 32 to ammonia separator or flash chamber 36. In flash separator 36, cooling and depressurizing of the effluent stream from line 32 causes vaporization of ammonia and hydrogen sulfide, which are discharged through line 33. Flash conditions are established so that only a minor amount of water is vaporized and sufficient water remains in the flash residue to maintain an easily pumpable slurry suspension of the catalyst.

Flash separator residue is removed from flash separator 36 through line 38. The flash residue in line 38 is essentially free of oil since no oil was introduced to low-temperature sulfiding zone 26 or intermediate temperature sulfiding zone 30. Feed oil is introduced to the system for the first time through line 40 and is admixed with a hydrogen-hydrogen sulfide mixture entering through lines 42 and 44. The flash residue in line 38 together with feed oil, hydrogen and hydrogen sulfide is introduced through line 46 to high-temperature sulfiding zone 48.

High-temperature sulfiding zone 48 is operated at a temperature higher than the temperature in intermediate temperature sulfiding zone 30. In high-temperature sulfiding zone 48, molybdenum oxysulfide or tungsten oxysulfide is converted to highly active molybdenum sulfide or tungsten sulfide. The preparation of the catalyst is now complete. Some hydroprocessing of the feed oil entering through line 40 is performed in high-temperature sulfiding zone 48.

High-temperature sulfiding zone 48 is operated at a temperature higher than the temperature in intermediate temperature sulfiding zone 30. In high-temperature sulfiding zone 48, molybdenum oxysulfide or tungsten oxysulfide is converted to highly active molybdenum sulfide or tungsten sulfide. The preparation of the catalyst is now complete. Some hydroprocessing of the feed oil entering though line 40 is performed in high-temperature sulfiding zone 48.

An effluent stream from high-temperature sulfiding zone 48 is passed through lines 50 and 52 to hydroprocessing reactor 56. Hydroprocessing reactor 56 is operated at a temperature higher than the temperature in high-temperature sulfiding zone 48. If the slurry catalyst bypassed high-temperature sulfiding zone 48 enroute to hydroprocessing reactor 56, the high-temperature of hydroprocessing reactor 56 would cause the water in hydroprocessing reactor 56 to oxygenate the catalyst and compete with sulfiding, thereby causing the catalyst to be converted into a sulfur-deficient high coke producer. When high-temperature sulfiding zone 48 precedes the hydroprocessing reactor, the relatively lower temperature in zone 48 allows the sulfiding reaction to prevail over any competing oxidation reaction in the presence of water to complete the sulfiding of the catalyst and render it stable at the higher temperature of hydroprocessing zone 56. With certain oil feedstocks, the relatively lower temperature of high-temperature sulfiding zone 48 will suffice for performing the oil hydroprocessing reactions, in which case hydroprocessing reactor 56 can be dispensed with. However, most feed oils will require the relatively higher temperature in hydroprocessing reactor 56 to complete the oil hydrotreating reactions.

An effluent stream is removed from hydroprocessing reactor 56 through line 60 and passed to flash separator 62. An overhead gaseous stream is removed from separator 62 through line 64 and is passed through a scrubber 66 wherein impurities such as ammonia and light hydrocarbons are removed and discharged from the system through line 68. A stream of purified hydrogen and hydrogen sulfide is recycled through lines 70, 44 and 46 to high-temperature sulfiding reactor 48.

A bottoms oil is removed from separator 62 through line 72 and passed to atmospheric distillation tower 74. As indicated in the figure, various fractions are separated in tower 74 including a refinery gas stream, a C$_3$/C$_4$ light hydrocarbon stream, a naphtha stream, a No. 2 fuel oil and a vacuum charge oil stream for passage to a vacuum distillation tower, not shown.

A concentrated catalyst slurry stream is removed from the bottom of tower 74 through line 76. Some of this catalyst-containing stream can be recycled to hydroprocessing reactor 56 through lines 58 and 52, if desired. Most, or all, of the heavy catalytic slurry in line 76 is passed to deasphalting chamber 78 from which a deasphalted oil is removed through line 81. A highly concentrated deactivated catalyst stream is removed from deasphalting chamber 78 through line 80 and passed to catalyst generation zone 82.

The catalyst entering regeneration zone 82 comprises molybdenum sulfide or tungsten sulfide together with impurity metals acquired from the feed oil. The impurity metals comprise primarily vanadium sulfide and nickel sulfide. In regeneration chamber 82 all of the metal sulfides are oxidized by combustion to the oxide state. The metal oxides are then passed through line 84 to catalyst reclamation zone 86. In reclamation zone 86 molybdenum oxide or tungsten oxide is separated from impurity metals including vanadium oxide and nickel oxide by any suitable means. Non-dissolved impurity metals including vanadium and nickel are discharged from the system through line 88 while purified and concentrated molybdenum oxide or tungsten oxide is passed through line 16 for mixing with make-up molybdenum or tungsten oxide entering through line 10, to repeat the cycle.

If desired, the process shown in FIG. 7 can be modified by inserting ammonia flash chamber 36 in advance of intermediate temperature sulfiding reactor 30. In that case, the hydrogen and hydrogen sulfide mixture in line 42 and the feed oil in line 40 can be charged to intermediate temperature sulfiding reactor 30. The effluent from intermediate temperature sulfiding reactor 30 then would be passed directly to high-temperature sulfiding reactor 48, without any intermediate separation.

Figure 8:
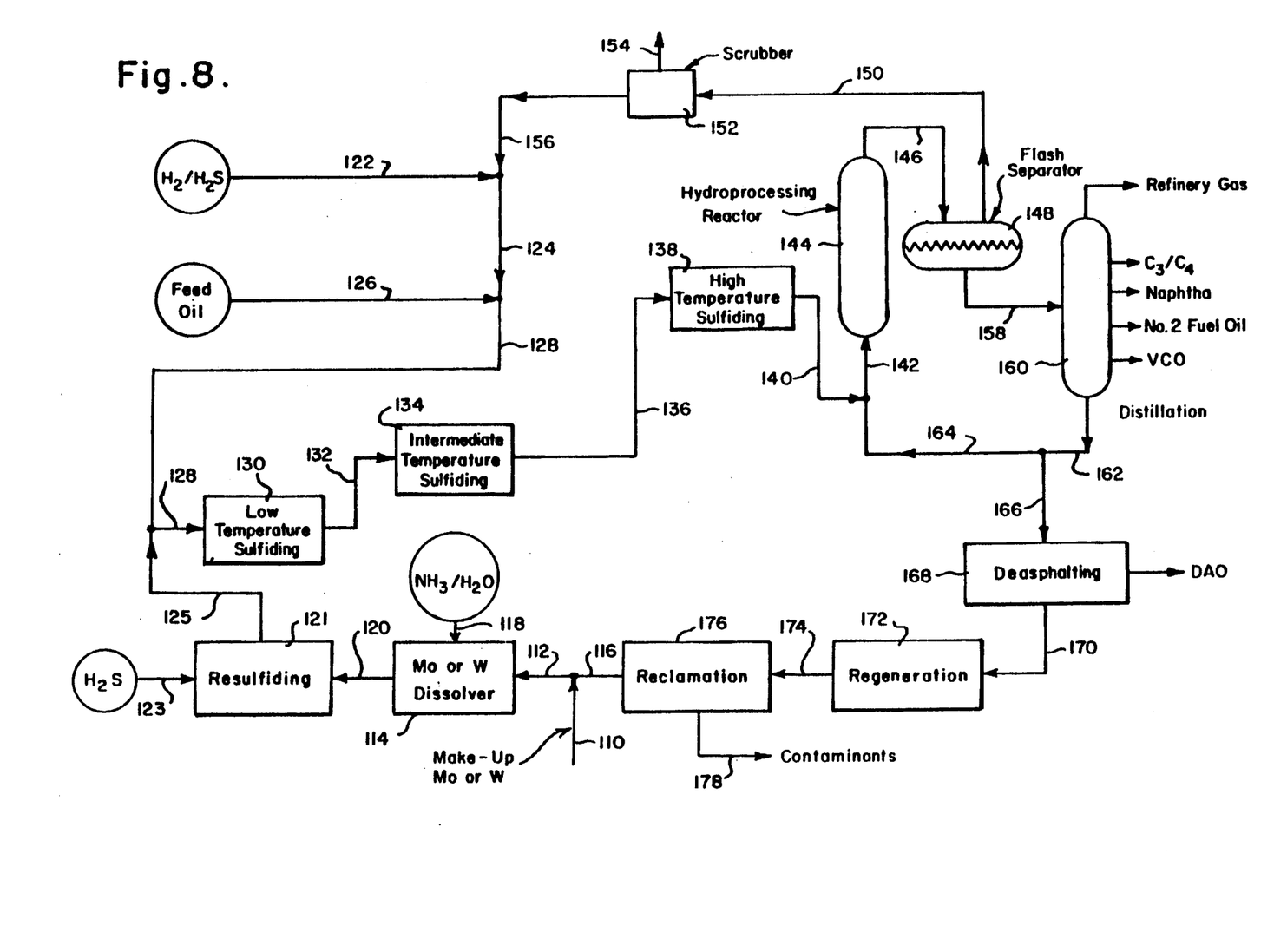
FIG. 8 illustrates a flow scheme for the preparation of a slurry catalyst by the oil method and the use of said catalyst in a hydroprocess.

FIG. 8 illustrates a process for preparing a catalyst by the oil method As shown in FIG. 8, catalytic molybdenum or tungsten, in the form of water-insoluble $MoO_3$ or $WO_3$, is introduced through lines 110 and 112 to dissolver zone 114. Recycle molybdenum or tungsten, from a source described below, is introduced through line 116. Water and ammonia are added to dissolver zone 114 through line 118. Water-insoluble molybdenum oxide or tungsten oxide is converted to water soluble ammonium molybdate salts or ammonium tungstate salts in dissolver zone 114.

Aqueous ammonium molybdate or ammonium tungstate containing excess ammonia is discharged from zone 114 through line 120 and then passed through presulfiding zone 121 to which hydrogen sulfide is added through line 123. The effluent from zone 121 is passed through line 125 and admixed with hydrogen and hydrogen sulfide entering through lines 122 and 124 and feed oil entering through line 126 and then passed through line 128 to low-temperature sulfiding zone 130. In low-temperature sulfiding zone 130, ammonium molybdate or ammonium tungstate is converted to thiosubstituted ammonium molybdates or thiosubstituted ammonium tungstates. In low-molybdates temperature sulfiding zone 30 the sulfiding temperature is sufficiently low that the ammonium salt is not decomposed while thiosubstitution is beginning. If the ammonium salt were decomposed in the early stages of thiosubstitution, an insoluble molybdate or oxythiomolybdate in a mixture with $MoO_3$, or an insoluble tungstate or oxythiotungstate or in a mixture with $WO_3$ would precipitate out in zone 130 and tend to plug zone 130.

An effluent stream from low-temperature sulfiding zone 130 is passed through line 132 to intermediate temperature sulfiding zone 134. Intermediate temperature sulfiding zone 134 is operated at a temperature higher than the temperature in low-temperature sulfiding zone 130. The sulfiding reaction is continued in zone 134 and ammonium oxythiomolybdate or ammonium oxythiotungstate is converted to molybdenum oxysulfide and/or molybdenum trisulfide or tungsten oxysulfide and/or tungsten trisulfide, thereby freeing ammonia.

An effluent stream from intermediate temperature sulfiding zone 134 is passed through line 136 to high-temperature sulfiding zone 138. High-temperature sulfiding zone 138 is operated at a temperature higher than the temperature in intermediate temperature sulfiding zone 134. In high-temperature sulfiding zone 138, molybdenum oxysulfide or tungsten oxysulfide is converted to highly active molybdenum sulfide or tungsten sulfide. The preparation of the catalyst is now complete. Some hydroprocessing of the feed oil entering through line 126 is performed in high-temperature sulfiding zone 138.

An effluent stream from high-temperature sulfiding zone 138 is passed through lines 140 and 142 to hydroprocessing reactor 144. Hydroprocessing reactor 144 is operated at a temperature higher than the temperature in high-temperature sulfiding zone 138. If the slurry catalyst bypassed high-temperature temperature reactor 138 enroute to hydroprocessing reactor 144, the high-temperature of hydroprocessing reactor 144 would cause the water in hydroprocessing reactor 144 to oxygenate the catalyst and compete with sulfiding thereby causing the catalyst to be converted into a sulfur-deficient high coke producer. When high-temperature sulfiding zone 138 precedes the hydroprocessing reactor, the relatively lower temperature in zone 138 allows the sulfiding reaction to prevail over any competing oxidation reaction in the presence of water to complete the sulfiding of the catalyst and render it stable at the higher temperature of hydroprocessing zone 144. With certain oil feedstocks, the relatively lower temperature of high-temperature sulfiding zone 138 will suffice for performing the oil hydroprocessing reactions, in which case hydroprocessing reactor 144 can be dispensed with. However, most feed oils will require the relatively higher temperature in hydroprocessing reactor 144 to complete the oil hydrotreating reactions.

An effluent stream is removed from hydroprocessing reactor 144 through line 146 and passed to flash separator 148. An overhead gaseous stream is removed from separator 148 through line 150 and is passed through a scrubber 152 wherein impurities such as ammonia and light hydrocarbons are removed and discharged from the system through line 154. A stream of purified hydrogen and hydrogen sulfide is recycled through lines 156, 124 and 128 to low-temperature sulfiding reactor 130.

A bottoms oil is removed from separator 148 through line 158 and passed to atmospheric distillation tower 160. Various fractions are separated in tower 160 including a refinery gas stream, a $C_3/C_4$ light hydrocarbon stream, a naphtha stream, a No. 2 fuel oil and a vacuum charge oil stream for passage to a vacuum distillation tower, not shown.

A concentrated catalyst slurry stream is removed from the bottom of tower 160 through line 162. Some of this catalyst-containing stream can be recycled to hydroprocessing reactor 144 through lines 162 and 164, if desired. Most, or all, of the heavy catalytic slurry in line 162 is passed through line 166 to deasphalting chamber 168 from which a deasphalted oil is removed through line 170. A highly concentrated deactivated catalyst stream is removed from deasphalting chamber 168 through line 170 and passed to catalyst generation zone 172.

The catalyst entering regeneration zone 172 comprises molybdenum sulfide or tungsten sulfide together with any impurity metals acquired from the feed oil. The impurity metals comprise primarily vanadium sulfide and nickel sulfide. In regeneration chamber 172 all of these metal sulfides are oxidized by combustion to the oxide state. The metal oxides are then passed through line 174 to catalyst reclamation zone 176. In reclamation zone 176 molybdenum oxide or tungsten oxide is separated from impurity metals including vanadium oxide and nickel oxide by any suitable means.

Non-dissolved impurity metals including vanadium and nickel are discharged from the system through line 178 while purified and concentrated molybdenum oxide or tungsten oxide is passed through line 116 for mixing with make-up molybdenum or tungsten oxide entering through line 110, to repeat the cycle.

What is claimed is:

1. A Group VIB metal sulfide slurry catalyst for the hydroprocessing of heavy hydrocarbonaceous oil or residue prepared by a process comprising the steps of:
    (a) sulfiding a Group VIB metal, ammonia-containing compound in an aqueous phase, in the substantial absence of hydrocarbon oil, with hydrogen sulfide, at a temperature less than about 350° F., to form a presulfided product without substantial loss of ammonia;
    (b) separating ammonia from said presulfided product to form a sulfided product;
    (c) charging said sulfided product into a hydroprocessing reactor zone at a temperature sufficient to convert said sulfided product into an active hydroprocessing catalyst;

wherein said catalyst is characterized by a pore volume in the range of 10 to 300Å radius pore size of from about 0.1 to about 1 cc/g and a surface area of from about 20 to about 400 m$^2$/g.

2. The catalyst of claim 1 wherein said Group VIB metal is tungsten.

3. The catalyst of claim 1 wherein said sulfided product is approximately of the empirical formula of a Group VIB metal disulfide.

4. The catalyst of claim 1 wherein said Group VIB metal is molybdenum.

5. The catalyst of claim 4 wherein said Group VIB metal sulfide is approximately of the empirical formula of molybdenum disulfide.

6. The catalyst of claim 1 including a Group VIII metal.

7. The catalyst of claim 1 including nickel.

8. The catalyst of claim 1 including cobalt.

* * * * *